United States Patent [19]

Kamei et al.

[11] 4,190,771

[45] Feb. 26, 1980

[54] RADIATION DETECTION ELEMENT

[75] Inventors: Hisashi Kamei, Tokyo; Shimpey Shirayama, Yokohama; Tsuneo Nakakita, Kawasaki; Moriyoshi Murata; Yushichi Kikuchi, both of Tokyo, all of Japan

[73] Assignee: Tokyo Shibaura Denki Kabushiki Kaisha, Kawasaki, Japan

[21] Appl. No.: 936,085

[22] Filed: Aug. 23, 1978

[30] Foreign Application Priority Data

Aug. 24, 1977 [JP] Japan ............................... 52/100605

[51] Int. Cl.$^2$ ................................................ G01T 1/18

[52] U.S. Cl. ................................................ 250/385

[58] Field of Search ............... 250/374, 375, 382, 385, 250/388

[56] References Cited

U.S. PATENT DOCUMENTS

| | | | |
|---|---|---|---|
| 3,772,521 | 11/1973 | Perez-Mendez | 250/385 |
| 3,911,279 | 10/1975 | Gilland et al. | 250/385 |
| 4,031,396 | 6/1977 | Whetten et al. | 250/385 |

*Primary Examiner*—Davis L. Willis

*Attorney, Agent, or Firm*—Oblon, Fisher, Spivak, McClelland & Maier

[57] ABSTRACT

A radiation detection element comprises an insulating base frame having a pair of leg portions with a spacing left therebetween, a pair of electroconductive members each disposed on one surface of the corresponding leg portions of the base frame, an electrode plate disposed on the rear surface of the base plate to cover the spacing between the leg portions, and a plurality of signal electrode wires spanned between the electroconductive members such that they confront the electrode plate, in which an insulating member is disposed between the base frame and the electroconductive member and/or between the base frame and the electrode plate such that its longitudinal edge portion is overhung into the spacing of the base frame.

8 Claims, 5 Drawing Figures

FIG. 1
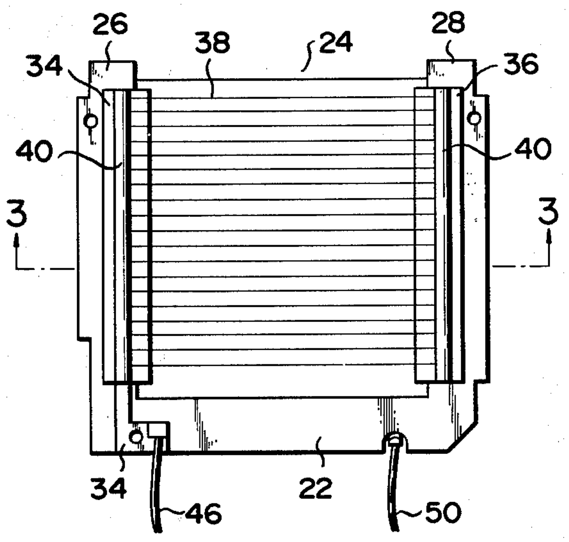
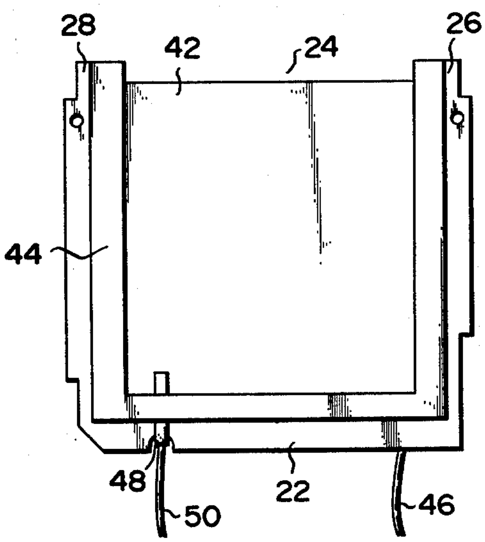
FIG. 2

RADIATION DETECTION ELEMENT

BACKGROUND OF THE INVENTION

This invention relates to a radiation detection element for radiation detectors which can prevent a possible burn-out of signal electrode wires.

In X-ray tomographing apparatus, a radiation detector is used in which in order to detect an amount of X-ray passed through, for example, the body of a human being (a subject) a plurality of radiation detection elements are regularly arranged and, for example, a xenon gas is sealed. In use, a high voltage of, for example, about 1500 volts is applied to each detector element and the xenon gas is ionized upon the entry of an X-ray. The extent of ionization of xenon gases corresponds to an amount of incident X-ray and thus the intensity of X-rays is detected by measuring ion current corresponding to an amount of variation of incident X-rays.

One of such known detection element comprises a substantially U-shaped insulating synthetic resin base frame incorporated with, for example, glass fibers and having a pair of leg portions, an electroconductive member, for example, a copper foil attached to each of the leg portions of the base frame, a plurality of fine, signal electrode wires soldered to the copper foil such that they are spanned between the leg portions of the base frame, an opposite electrode plate disposed on the rear surface of the base frame such that is confronts the signal electrode wires, and a support insulating member for supporting the opposite electrode plate.

In use, a high voltage of about 1500 volts is applied between the signal electrode wires and the opposite electrode plate of the detection element. At this time, an electric field tends to be intensified in those portions of the wires closer to the leg portions of the base frame. For this reason and because the signal electrode wires are relatively thin, a discharge tends to occur in the neighborhood of the leg portion, providing a cause for a possible burn-out of the wires.

SUMMARY OF THE INVENTION

It is accordingly the object of this invention to provide a radiation detection element which can prevent a possible discharge resulting from the local intensification of electric field and thus a possible burn-out of signal electrode wires.

According to this invention there is provided a radiation detection element comprising an insulating base frame having a pair of leg portions with a spacing left therebetween, a pair of electroconductive members disposed along one surface of the corresponding leg portions of the base frame, an electrode plate disposed on the rear surface of the base plate to cover the spacing between the leg portions, and a plurality of signal electrode wires, in which an insulating member is disposed between the base frame and the electroconductive member and/or between the base frame and the electrode plate such that its edge portion is overhung beyond the inner wall surface of the leg portion into the spacing left between the leg portions.

BRIEF DESCRIPTION OF THE DRAWINGS

FIG. 1 is a front view showing a radiation detection element according to one embodiment of this invention.

FIG. 2 is a rear view showing detection element of FIG. 1;

PREFERRED EMBODIMENTS OF THE INVENTION

One embodiment of a radiation detection element of this invention will be explained by referring to FIGS. 1, 2 and 3.

Figure 3:
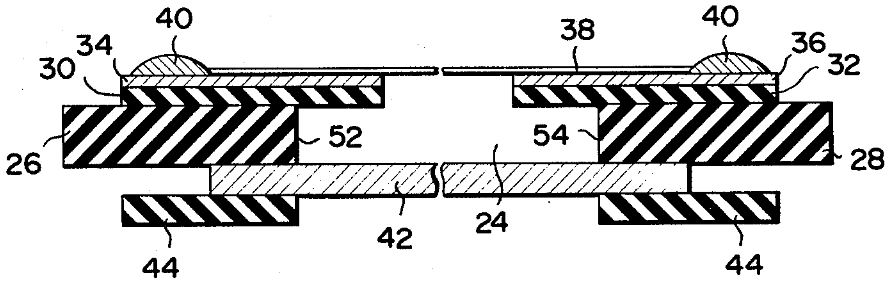
FIG. 3 is an enlarged cross-sectional view, taken along 3—3 in FIG. 1, showing the detection element of FIG. 1.

FIG. 1 is a front view showing a radiation detection element, FIG. 2 a rear view of the radiation detection element, and FIG. 3 an enlarged cross-sectional view of the radiation detection element as taken along line 3—3 in FIG. 1.

Reference numeral 22 shows an insulating base frame of, for example, epoxy resin incorporated with glass fiber. The base frame is substantially U-shaped and has a pair of parallel legs 26, 28 with a spacing 24 left therebetween. About 35 μ-thick heat-resistant insulating members 30 and 32 made of, for example, polyimide resin are attached to the longitudinal surfaces of the leg portions 26 and 28, respectively. To the surfaces of the insulating members 30 and 32 are attached electroconductive members, for example copper foils 34 and 36, having a thickness of about 35 μ. A plurality of wires 38 made of, for example tungsten, are arranged parallel to each other and spans the spacing 24 between the legs 26 and 28, the wires 38 constituting a signal electrode. The respective ends of the wires are secured by a solder 40 to the copper foils 34 and 36. An opposite electrode plate 42 made of, for example molybdenum, is attached to the rear surface of the insulating base frame 22 and wholly covers the spacing 24 between the leg portions 26 and 28 to provide an electrode opposite to the signal electrode. The opposite electrode plate 42 is supported by a substantially U-shaped insulating member 44 which is the same in material as the insulating frame 22.

A lead wire 46 is soldered at one end to the copper foil 34 and extends from the copper foil 34 and a lead wire 50 extends from the opposite electrode plate 42 through an electroconductive member 48 secured to the opposite electrode plate 42. As will be understood particularly from FIG. 3, the insulating member 30 and copper foil 34, and insulating member 32 and copper foil 36, have their portions inwardly overhang into the spacing 24 of the insulating base frame 22, permitting their overhanging portions to directly confront the opposite electrode plate 42. Thus, a radiation detection element is provided. A plurality of such radiation detection elements are superposed to constitute a radiation detector. In use, a high voltage of about 1500 volts is applied between the signal electrode wire 38 and the opposite electrode plate 42 to permit an ionized electric current of xenon gas to flows through the wires. Since in this case the portions of the wires closer to the inner wall surfaces 52 and 54 of the leg portions 26 and 28 of the insulating base frame 22 do not directly confront the opposite electrode plate 42, local intensification of an electric field in the neighborhood of the inner wall surfaces 52 and 54 of the leg portions is prevented. This prevents a possible discharge between the wires 38 and the opposite electrode plate 42 and thus a possible burn-out of the wire is prevented. Even where any foreign substance such as dirt or dust enters in the neighborhood of the inner wall surfaces 52 and 54 of the legs 26 and 28, since the overhanging portions of the insulating members 30 and 32 extend into the spacing 24 of the base frame 22, a possible shorting between the wires 38 and the opposite electrode plate 42 is prevented, and thus a possible burn-out is prevented. The overhanging structure of the insulating members 30 and 32 improves the withstanding voltage property of the radiation detection element.

A method for manufacturing the above-mentioned radiation detection element will now be explained below.

First, a substantially U-shaped insulating base frame 22 made of a glass-fiber incorporated epoxy resin is prepared. Also prepared are insulating members 30, 32 to one surface of each of which an electroconductive foil (34, 36) made of, for example, copper is attached. The insulating members 30 and 32 are attached by an adhesive to the surfaces of the leg portions 26 and 28 of the insulating base frame 22. At this time, the insulating members 30 and 32 must be attached such that their longitudinal inner edge portions are overhung into a spacing 24 of the base frame 22. Then, an opposite electrode plate 42 is disposed on the reverse surface of the insulating base frame 22 to cover the spacing 24 of the base frame 22.

A substantially U-shaped insulating support member 44 is bonded to the marginal portion of the rear surface of the opposite electrode plate 42 such that is straddles the insulating base frame 22, and the opposite electrode 42 is secured to the base frame 22 by bonding the insulating member 44 to the insulating base frame 22. Thereafter, a plurality of signal electrode wires 38 are stretched between the copper foils 34 and 36, and the respective ends of each wire 38 are soldered to the copper foils 34 and 36. Finally, lead wires 46, 50 are attached by, for example, solder to the predetermined positions of the resultant structure. Thus, a radiation detection element as shown in FIGS. 1 to 3 is manufactured.

Figure 4:
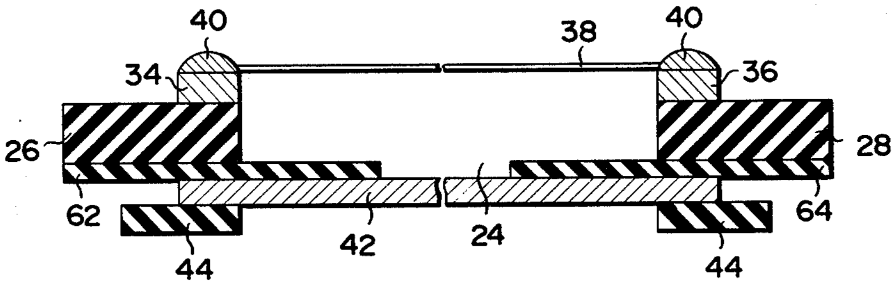
FIG. 4 is a cross-sectional view showing another embodiment of this invention.
Figure 5:
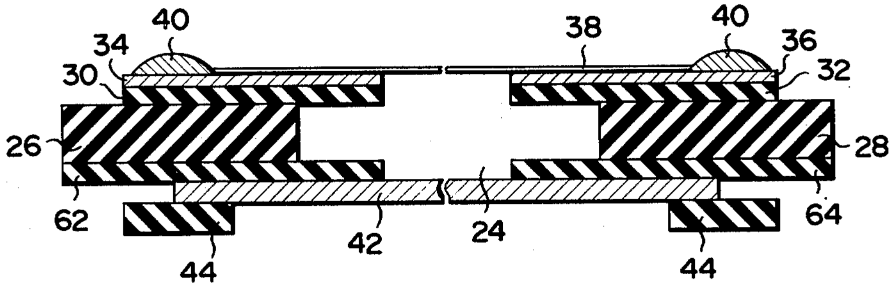
FIG. 5 is a cross-sectional view showing another embodiment of this invention.

FIGS. 4 and 5, each, show another embodiment of this invention. The same reference numerals are employed to designate parts or elements corresponding to those shown in FIGS. 1 to 3 and any further explanation is therefore omitted.

In the embodiment shown in FIG. 4 no insulating member is provided between a copper foil 34 and a leg portion 26 and between a copper foil 36 and a leg portion 28. Instead, insulating members 62 and 64 are provided one between the leg portion 26 and an opposite electrode plate 42 and one between the leg portion 28 and the opposite electrode plate 42.

In the embodiment shown in FIG. 5, insulating members 30, 32 are disposed one on the upper surface of leg portions 26 and 28 and one on the lower surface of the leg portions 26 and 28. That is, the insulating member 30 is disposed between the leg portion 26 and a copper foil 34 and the insulating member 32 between the leg portion 28 and a copper foil 36. An insulating member 62 is disposed between the leg portion 26 and the opposite electrode plate 42, and an insulating member 64 between the leg portion 28 and the opposite electrode plate 42.

In the embodiments of FIGS. 4 and 5 the insulating member is extended beyond inner wall surface 52, 54 of the leg portions into a spacing 24, preventing a possible electric field intensification in the neighborhood of the inner wall surface 52, 54 of the leg portions and thus a possible discharge. By so doing, a possible burn-out of signal electrode wires 38 is prevented. Since the insulating member is overhung into the spacing 24, even if any foreign matter such as dirt or dust is deposited at or in the neighborhood of the inner wall surfaces of the leg portions 26 and 28, a possible shorting between the wires 38 and the opposite electrode plate 42 is prevented and in consequence a possible burn-out of the wire 38 is prevented.

What we claim is:

1. A radiation detection element comprising an insulating base frame having a pair of leg portions with a spacing left therebetween; a pair of electroconductive members each disposed along one surface of the corresponding leg portions; an electrode plate disposed on the rear surface of the insulating base frame to cover the spacing between the leg portions; a plurality of signal electrode wires disposed between the electroconductive members such that they confront the electrode plate; and an insulating member disposed at least between the insulating base frame and the electroconductive member or between the insulating base plate and the electrode plate and having its longitudinal edge portion overhung beyond the inner wall surface of the insulating base frame into the spacing between the leg portions of the base frame.

2. A radiation detection element according to claim 1 in which said insulating member is disposed between the insulating base frame and the electrode plate.

3. A radiation detection element according to claim 1 in which said insulating member is disposed between the insulating base frame and the electroconductive member and the portion of the electroconductive member extends substantially over the overhanging portion of the insulating member.

4. A radiation detection element according to claim 1 in which the insulating member is disposed between the insulating base frame and the electrode plate and between the insulating base plate and the electroconductive member, and the portion of the electroconductive member extends substantially coextensive with the overhanging portion of the insulating members.

5. A radiation detection element according to any one of claims 1 to 4, in which said insulating member is made of a heat-resistant material.

6. A radiation detection element according to claim 5 in which said heat-resistant material is polyimide resin.

7. A radiation detection element according to claim 1, in which said electroconductive member has a thickness of about 35 microns.

8. A radiation detection element according to claim 1, in which said insulating member has a thickness of substantially 35 microns.

* * * * *